Patented July 21, 1931

1,815,778

UNITED STATES PATENT OFFICE

ANSEL M. KINNEY, OF CHICAGO, ILLINOIS, ASSIGNOR TO STANDARD OIL COMPANY, OF WHITING, INDIANA, A CORPORATION OF INDIANA

ART OF COMPOUNDING RUBBER

No Drawing.   Application filed May 6, 1926. Serial No. 107,286.

The present invention relates to improvements in the art of preparing rubber compounds and in the resulting compounds themselves, and will be fully understood from the following description thereof.

I have found that the properties of rubber compounds may be substantially improved, particularly with respect to durability, elongation and tensile strength by incorporating into such rubber compounds prior to vulcanization thereof, suitable proportions of mineral oil naphthenic compounds. Such naphthenic compounds may be of two types; those present in naphthenic oils, such as the crude oils found in Louisiana, which compounds are preferentially soluble in an alkaline solution in the presence of the oil in which they occur and those naphthenic compounds, the alkaline metal compounds of which are preferentially soluble in the oil in which they occur in the presence of water or an aqueous solution of alkali. The former type may be designated as the preferentially water soluble naphthenic compounds, and the latter as the preferentially oil soluble naphthenic compounds. Although both types of compounds may be employed in carrying out the invention, I have found that the best results are secured by the use of the preferentially oil soluble type, and therefore refer to the same in the specific example hereinafter set forth.

Although the alkali salts or other metallic salts of both types of naphthenic compounds may be employed, I prefer to employ the naphthenic acids themselves, which may or may not be accompanied by some mineral oil without deleterious effect upon the rubber compound. I may employ from 0.5 to 5 parts of the naphthenic compound, and particularly naphthenic acids, per one hundred parts of rubber in the compound containing the usual compounding constituents, such as sulfur, zinc oxide, other fillers as desired, and accelerators. For example, a specific compound which I have prepared contains 100 parts rolled brown rubber, 6 parts sulfur, 5 parts zinc oxide, 1 part accelerator and 2 parts of preferentially oil soluble naphthenic acid, accompanied by an approximately equivalent amount of oil, which latter I have found to have substantially no effect upon the properties of the resulting compound. Such a compound, suitably vulcanized, for example, for 30 to 90 minutes at 290° F., shows very markedly improved properties over a similar compound from which the naphthenic acid is absent.

It is readily apparent that the proportions of the compounding ingredients given above are merely illustrative and may be varied within the knowledge of the rubber compounder. The naphthenic compounds may be supplied in any desired way and in suitable proportions in any rubber compound prior to vulcanization, in accordance with my invention.

I claim:

1. A rubber compound containing rubber, vulcanizing constituents, and a substance selected from the group consisting of preferentially oil soluble naphthenic acids derived from mineral oils and the alkali metal salts of such acids.

2. A rubber compound comprising rubber, vulcanizing constituents, and perferentially oil soluble naphthenic acids derived from mineral oils.

3. A rubber compound comprising rubber, vulcanizing constituents, and preferentially oil soluble naphthenic acid in the proportion of 0.5 to 5 parts per 100 parts of rubber in the compound.

4. A rubber compound comprising rubber vulcanizing constituents, and preferentially oil soluble naphthenic acids derived from mineral oils and free from metallic naphthenates and other naphthenic acid derivatives.

5. The method of preparing a rubber compound comprising incorporating therein prior to vulcanization a substance selected from the group consisting of preferentially oil soluble naphthenic acid derived from mineral oils and the alkali metal salts of such acid.

6. The method of preparing a rubber compound which comprises incorporating therein prior to vulcanization a preferentially oil soluble naphthenic acid derived from mineral oil.

7. The method of preparing a rubber compound which comprises incorporating therein prior to vulcanization preferentially oil soluble naphthenic acid derived from mineral oil and free from metallic naphthenates and other naphthenic acid derivatives.

ANSEL M. KINNEY.